(12) United States Patent
Pederson et al.

(10) Patent No.: US 11,066,254 B1
(45) Date of Patent: Jul. 20, 2021

(54) DISTRIBUTION RAMP FOR DRY AGRICULTURAL PRODUCT APPLICATOR

(71) Applicant: CNH Industrial Canada, Ltd., Saskatoon (CA)

(72) Inventors: Nicholas R. Pederson, Willmar, MN (US); Charles O'Connell, Willmar, MN (US); Joel Denis, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 0 days.

(21) Appl. No.: 16/746,139

(22) Filed: Jan. 17, 2020

(51) Int. Cl.
| | |
|---|---|
| *B65G 53/50* | (2006.01) |
| *B65G 53/04* | (2006.01) |
| *A01M 9/00* | (2006.01) |
| *A01C 15/04* | (2006.01) |

(52) U.S. Cl.
CPC .............. *B65G 53/04* (2013.01); *A01C 15/04* (2013.01); *A01M 9/003* (2013.01)

(58) Field of Classification Search
CPC .... B65G 53/50; B65G 53/521; B65G 53/523; B65G 53/528; A01C 7/082; A01C 7/084; A01C 15/04; A01C 21/002; E03C 2001/026; B01F 3/18; B01F 5/061; B01F 5/0646; F15D 1/02; F15D 1/025; F16L 9/006; F16L 41/03; F16L 41/023; Y10T 137/85938
USPC ......... 406/83, 157, 181, 182, 183, 191, 192, 406/195, 198; 138/44; 110/309, 310, 110/101 R, 104 R; 137/561 A, 625.11; 111/174
See application file for complete search history.

(56) References Cited

U.S. PATENT DOCUMENTS

| | | | | |
|---|---|---|---|---|
| 121,350 A | * | 11/1871 | Finley | ..................... B62C 11/00 54/53 |
| 3,697,050 A | | 10/1972 | Stanley | |
| 3,698,430 A | * | 10/1972 | Van Gasselt | ............. G21C 1/02 366/181.5 |
| 4,201,321 A | * | 5/1980 | Patzelt | .................. B29C 44/461 222/478 |

(Continued)

FOREIGN PATENT DOCUMENTS

| | | |
|---|---|---|
| CA | 2111611 C | 10/1998 |
| CA | 2461771 C | 7/2007 |

OTHER PUBLICATIONS

Chemical Engineering 117.7: 32. Access Intelligence LLC (Jul. 2010)—http://dialog.proquest.com/professional/docview/1083042318?accountid=157282.

(Continued)

*Primary Examiner* — Joseph A Dillon, Jr.
(74) *Attorney, Agent, or Firm* — Rebecca L. Henkel; Rickard K. DeMille

(57) ABSTRACT

A distribution ramp system for a dry product applicator with a pneumatic conveyance system is provided which lifts product that drags along a bottom surface(s) of a delivery line's wall(s) back into a main central or primary airflow portion that carries the product downstream through the pneumatic conveyance system. The system may include a ramp that nests against a bottom wall of the delivery line with a narrow front and wide back so the ramp presents a gradual wedge facing toward the incoming upstream airflow entrained with particulate material of the product, urging particulate material dragging on the bottom wall to lift away from the bottom wall and toward reentry into the primary airflow portion.

14 Claims, 6 Drawing Sheets

(56) References Cited

U.S. PATENT DOCUMENTS

| | | | | |
|---|---|---|---|---|
| 4,498,786 | A * | 2/1985 | Ruscheweyh | B01F 5/0268 137/896 |
| 4,899,772 | A * | 2/1990 | Rao | B01F 5/0471 137/1 |
| 4,964,575 | A | 10/1990 | Takata | |
| 5,080,581 | A | 1/1992 | Walker | |
| 5,325,391 | A * | 6/1994 | Hall | H01S 3/031 372/56 |
| 5,848,755 | A | 12/1998 | Zickell et al. | |
| 6,192,813 | B1 | 2/2001 | Memory et al. | |
| 7,581,387 | B2 * | 9/2009 | Bui | B01F 3/04049 60/286 |
| 8,297,873 | B1 * | 10/2012 | Schram | E01F 9/685 404/9 |
| 8,371,773 | B2 | 2/2013 | Bryan et al. | |
| 8,469,636 | B2 | 6/2013 | Jost et al. | |
| 9,546,051 | B2 | 1/2017 | Roberge et al. | |
| 9,604,793 | B2 | 3/2017 | Maguire et al. | |
| 9,631,959 | B1 * | 4/2017 | Wang | F15D 1/025 |
| 9,726,117 | B2 * | 8/2017 | Schroder | F02M 26/19 |
| 9,902,571 | B2 | 2/2018 | Hui et al. | |
| 10,500,551 | B2 * | 12/2019 | Hobbs | B01F 15/06 |
| 10,537,054 | B2 * | 1/2020 | Roberge | B05B 7/1477 |
| 10,549,931 | B2 * | 2/2020 | Roberge | B65G 53/528 |
| 10,743,462 | B2 * | 8/2020 | Setterdahl | A01C 21/00 |
| 10,814,292 | B2 * | 10/2020 | Roberge | A01C 21/002 |
| 2002/0121350 | A1 * | 9/2002 | Lamminen | B01F 5/0475 162/100 |
| 2007/0177452 | A1 | 8/2007 | Aroussi | |
| 2011/0001265 | A1 * | 1/2011 | Walia | B01F 15/0234 264/299 |
| 2016/0238423 | A1 * | 8/2016 | Steven | G01F 1/366 |
| 2016/0298777 | A1 * | 10/2016 | Huseyin | F02M 21/0239 |
| 2017/0122785 | A1 * | 5/2017 | Wang | G01F 1/40 |
| 2019/0021214 | A1 * | 1/2019 | Roberge | B05B 13/005 |

OTHER PUBLICATIONS

Procedia Engineering 102: 1056-63. Elsevier B.V. (Jan. 2015)—Yan Fei—https://reader.elsevier.com/reader/sd/pil/S1877705815002477?token=4D029EB8CB8614FCE5EFD7F57C189FB3E76DCD1D9261A51E66774EC065ECC1C886DA97C0D5FB95A6340D1DE04214D462.

* cited by examiner

DISTRIBUTION RAMP FOR DRY AGRICULTURAL PRODUCT APPLICATOR

FIELD OF THE INVENTION

The invention relates generally to agricultural product application equipment such as self-propelled dry product applicators and; in particular; to a distribution ramp system for a dry agricultural product applicator.

BACKGROUND OF THE INVENTION

Efforts have been made to allow dry agricultural product applicators to increase coverage in a single pass of an agricultural field. These include implementing boom-based pneumatic delivery systems instead of spinner-based broadcast spreader delivery systems. Other efforts include making the applicators larger and implementing longer booms that widen the application coverage per pass. The longer booms need longer product delivery lines such as tubes or hoses to pneumatically deliver the dry agricultural product. During pneumatic delivery, dry agricultural product particulate material can drift or settle out of the delivery line's centrally flowing main airflow portion and cling to or drag along the delivery line's inner circumferential surface or inside wall surface(s). This may include gravitationally settling out or dragging on the bottom of the inside wall. Relatively long delivery lines that move product toward the outer boom ends may be particularly susceptible to this type of gravitational or downward settling. The particulate material's settling, dragging, or drifting out of the main airflow portion can lead to delivery inconsistencies. These inconsistencies can be problematic when it occurs near a distributor that divides the airflow into separate airflows that flow through separate downstream lines to delivery nozzles on the applicator. Particulate material settling out of the main airflow upstream of or inside the distributor can lead to an uneven distribution of the particulate material through the distributor's outlet(s), downstream lines, downstream delivery nozzles, and potentially uneven application to the field.

SUMMARY OF THE INVENTION

A distribution ramp system for a dry agricultural product applicator with a pneumatic conveyance system is provided which redirects product that drags along a lower surface(s) of a delivery line's wall(s) back into a main central or primary airflow. A product delivery line ramp or distribution ramp of the distribution ramp system may present an angled surface that is tightly nested against a lower wall of a product delivery line in a manner that may lift the settled product back into the primary airflow. The nested ramp may include a narrow front end and wide back end, so the ramp presents a gradual wedge facing toward the incoming upstream airflow entrained with particulate material. This urges particulate material dragging on the bottom wall to lift away from the bottom wall, directing it upwardly for reentry into the primary airflow portion without abrupt changes in direction to promote glancing-type material redirection in preference to collision-induced bouncing-type redirection, resulting in less pressure drop.

According to one aspect of the invention, a distribution ramp system is provided for a dry agricultural product applicator with a pneumatic conveyance system through which particulate material of a dry agricultural product is guided from an upstream bulk storage system to downstream nozzles for delivery onto an agricultural field. The distribution ramp system may include a product delivery line with a circumferential sidewall that defines a bottom wall or lower wall segment. A distribution ramp with a ramp body may be mounted against the product delivery line lower wall segment. The ramp body may include a first end that defines a front end facing an upstream direction. A second end of the ramp defines a back end facing a downstream direction. A ramp surface extends between the front and back ends and is inclined with respect to the product delivery line's lower wall. This arrangement lifts or guides particulate material flowing along the product delivery line's lower wall segment upwardly away from the product delivery line lower wall.

According to another aspect of the invention, the ramp body may have a convex surface lower wall that nests snugly against a concave lower wall of the product delivery line, without an abrupt shoulder or intervening gap that could disrupt a smooth flow transition of particulate material from the delivery line onto the ramp surface and without trapping particulate material between the ramp and the product delivery line. This may be done with the matching radii of curvatures of the engaging convex and concave surfaces of the ramp body and delivery line. The ramp may have a pair of side edges extending angularly away from each other from the front end to the back end, so the ramp widens toward its back end and presents a narrow front that initially encounters and wedges under the low-height flowing particulate material.

According to another aspect of the invention, a mounting arrangement is defined at a point of engagement between the ramp and the product delivery line to positionally lock them to each other. The mounting arrangement may include a cooperating projection(s) and receptacle(s). The projection(s) may be defined by orientation bosses that extend downwardly from the ramp lower wall. The orientation bosses may define generally rectangular perimeter shapes and the orientation bosses may be arranged at different angles with respect to each other and a longitudinal axis of the ramp, including aligned with or perpendicular to it.

According to another aspect of the invention, at least one lock may be defined at the engagement of the ramp and the product delivery line to resist withdrawal of the ramp. The lock may include crush ribs at the orientation bosses that can deform to provide shoulders that engage corresponding surfaces of the product delivery line as mechanical stops that resist withdrawal of the orientation bosses. The orientation bosses may be taller than a thickness dimension of the product delivery line sidewall, so outer ends of the bosses extend beyond an outer circumferential surface of the product delivery line sidewall. Corresponding exposed portions of the crush ribs may deform to provide barb-like or other shoulders that resist withdrawal of the bosses from the openings or receptacles of the product delivery line.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 1 is an isometric view of an agricultural machine shown as a self-propelled dry product applicator with a distribution ramp system according to the present invention;

DETAILED DESCRIPTION OF THE PREFERRED EMBODIMENTS

Figure 1:
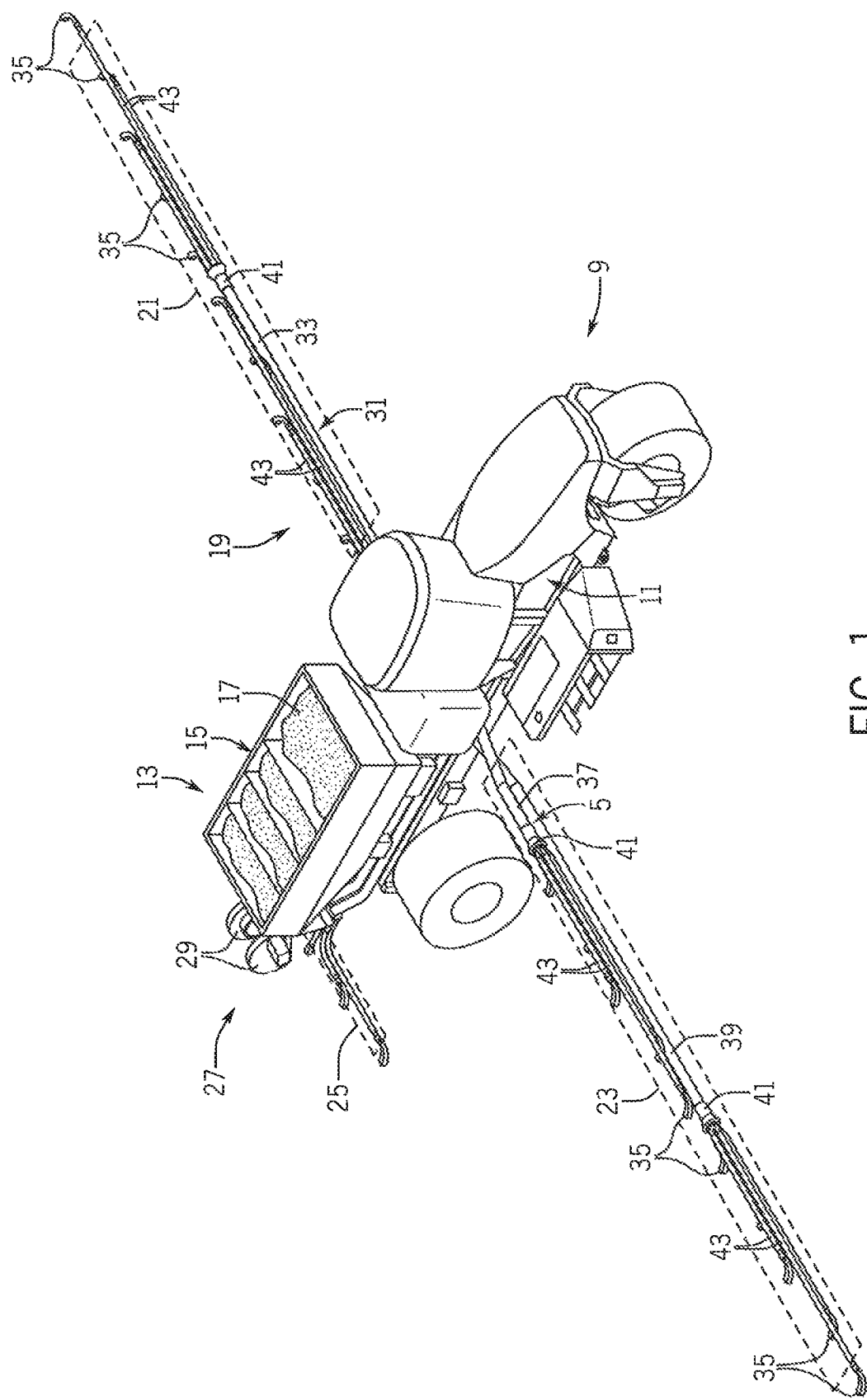

Referring now to the drawings and specifically to FIG. 1, a distribution ramp system is shown as system 5 that improves delivery consistency by redirecting pneumatically conveyed particulate matter of a dry agricultural product away from delivery line walls and back into a main airflow portion to provide a more uniform distribution of particulate matter in the conveying airflow.

Still referring to FIG. 1, system 5 is incorporated in an agricultural machine shown as a self-propelled dry product applicator 9, such as a Case IH-Titan™ series floater applicator available from CNH Industrial. The agricultural machine may be other machines including other applicators that use pneumatic conveyance to deliver, for example, particulate material, such as dry agricultural product, through booms or other structures with delivery lines.

Still referring to FIG. 1, applicator 9 includes chassis 11 with a chassis frame that supports various assemblies, systems, and components. These various assemblies, systems, and components include a cab, an engine, a hydraulic system that receives power from the engine to provide hydraulic pressure for operating hydraulic components and system, a bulk storage system 13 that includes a bin 15 that may have multiple compartments for storing different types of dry agricultural product(s) as volumes of respective particulate material 17, such as fertilizer, herbicide and insecticide. Boom system 19 pneumatically broadcasts or delivers the particulate material 17 to the agricultural field and includes segmented or other boom arms that can be folded for transportation or unfolded for use, such as left and right boom arms 21, 23 and a rear boom 25. Each of the left and right boom arms 21, 23 and rear boom 25 extends generally transversely with respect to the applicator's 9 longitudinal axis, when extended for application use.

Still referring to FIG. 1, pneumatic delivery or conveyance system 27 receives the particulate material from bin 15 through a metering system. Fan(s) 29 of the pneumatic conveyance system 27 may be hydraulically driven and delivers an airflow that entrains the particulate material that is released through the metering system. Pneumatic conveyance system 27 includes a delivery line system 31 that is supported by boom system 19.

Still referring to FIG. 1, delivery line system 31 includes a series of product delivery lines shown as delivery lines 33 that direct the particulate material 17 from its upstream storage in a downstream direction to nozzles 35 at ends of the delivery lines 33. Delivery lines 33 include various line segments, including primary delivery lines, product distributors, and secondary delivery lines. The primary delivery lines are shown here as short lines 37 (only one visible in this view) that extend a relatively shorter distance along their respective boom arms 21, 23 and long lines 39 that extend a relatively further distance along the respective boom arms 21, 23. Outer ends of the short and long lines 37, 39 are connected to product distributors 41.

Figure 2:
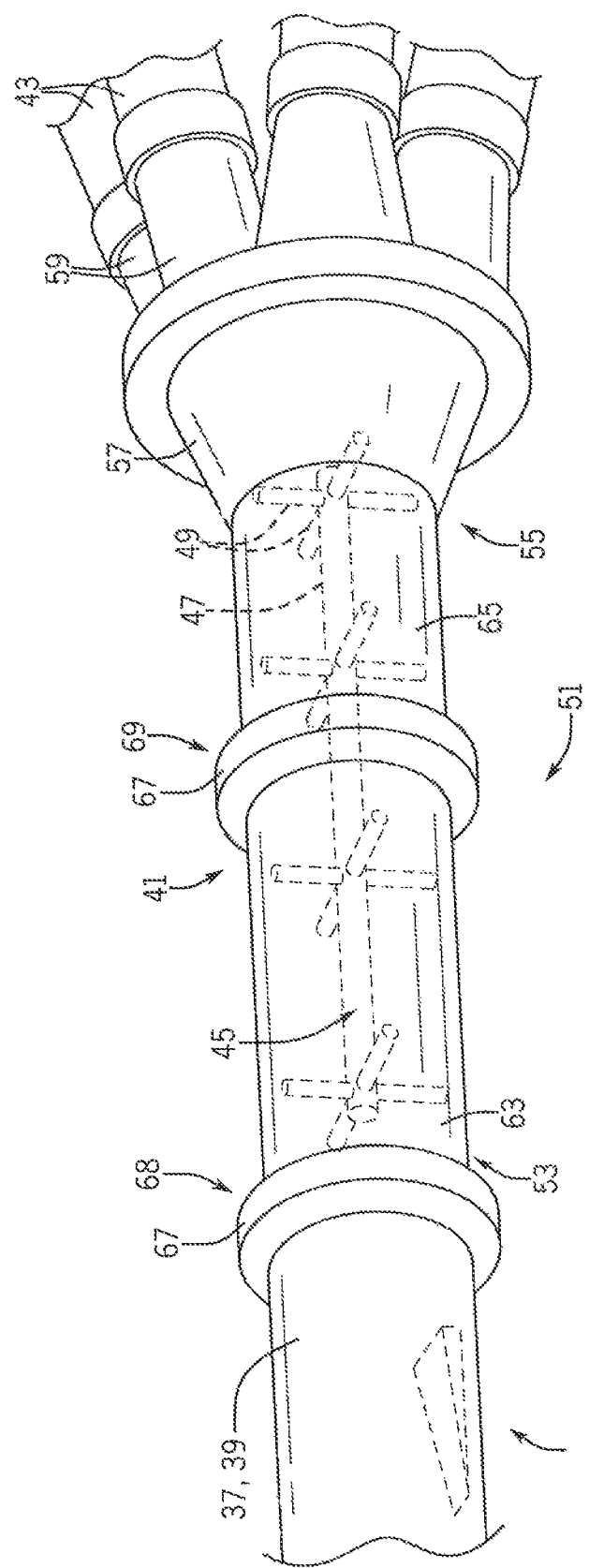
FIG. 2 is a simplified partially schematic isometric view of the distribution ramp system of FIG. 1.

Referring now to FIG. 2, each product distributor 41 is configured to divide a primary airflow into multiple secondary airflows respectively directed through secondary delivery lines, shown as secondary lines 43 with smaller diameters than the short and long lines 37, 39 and extend from the product distributor 41 to the nozzles 35. Distributor 41 is shown here with an agitator or mixer 45 in the product distributor 41. Mixer 45 has a mixer shaft 47 rotated by a motor (not shown) and with mixer fingers 49 that extend radially from the shaft 47 to collide with and deflect the particulate material 17 (FIG. 1) entrained in the conveying airflow. This randomizes and provides a more even distribution or better distribution of the particulate material 17. This equalizes the amount of particulate material 17 that is divided into and flows through the different secondary lines 43.

Still referring to FIG. 2, distributor 41 has a tubular main distributor body 51 with inlet end 53 that is connected to an upstream primary delivery line, such as short or long line 37, 39. Outlet end 55 includes divider 57 that has a conically expanding portion with multiple outlets 59 connected to the multiple downstream secondary lines 43. Main distributor body 51 is shown here in a segmented configuration with first and second body segments 63, 65 respectively at the inlet and outlet ends 53, 55. Connectors, represented here as v-band clamps 67, are shown as the connection hardware that secures the first body segment 63 to short or long line 37, 39 at a joint 68 and also secures the first and second body segments 63, 65 to each other to define a distributor tube joint 69 at their engagement(s).

Figure 3:
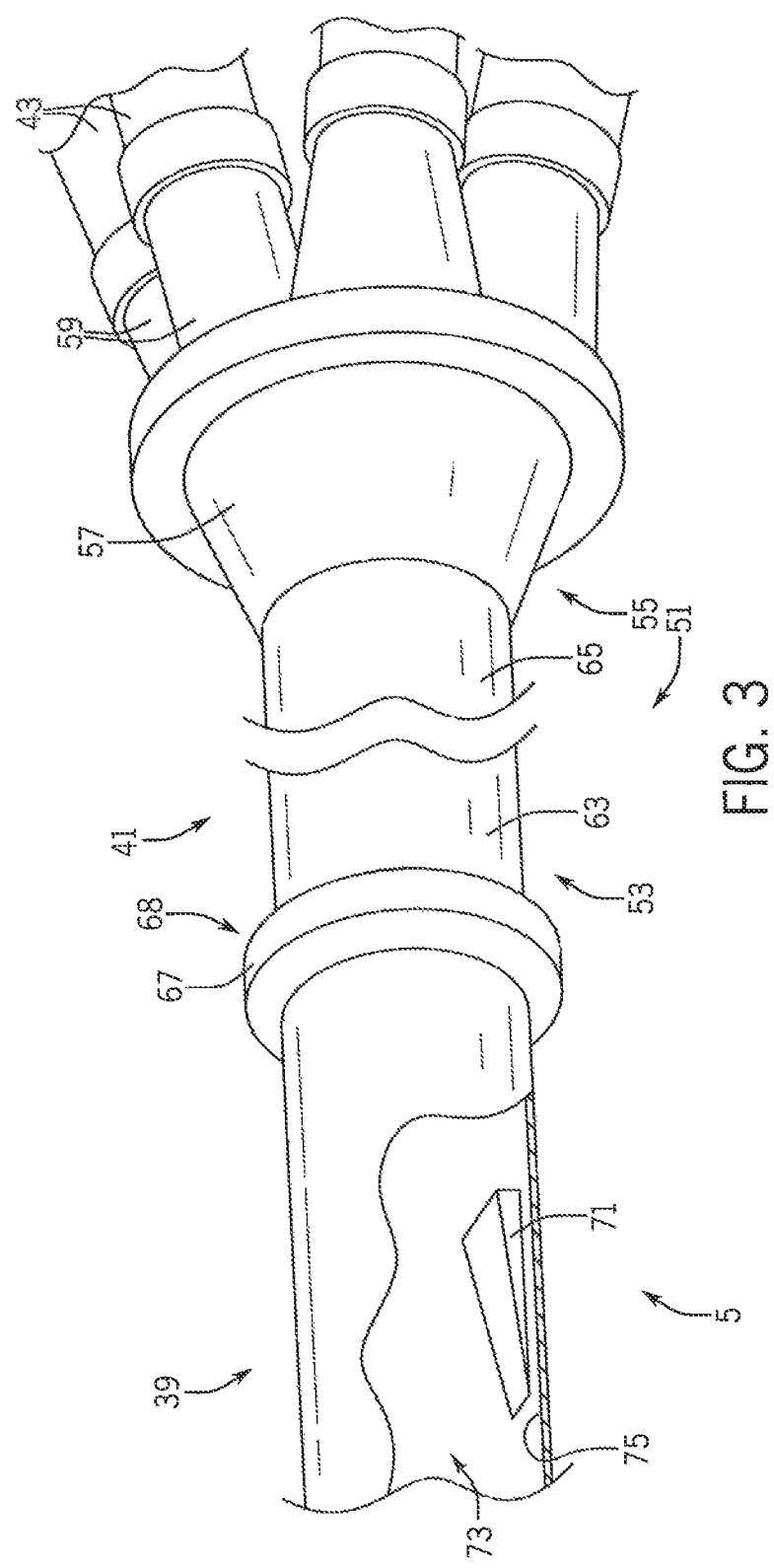
FIG. 3 is the simplified partially schematic isometric view of the distribution ramp system of FIG. 2 with a partial cutaway.

Referring now to FIG. 3, system 5 is shown implemented in long line 39, upstream and adjacent distributor 41. Although mixer 45 (FIG. 2) may be implemented in distributor 41, it is not shown here to simplify the view. System 5 includes a distribution ramp shown as ramp 71 that is mounted in the long line 39. Long line 39 includes a circumferential sidewall 73 with a lower wall segment of the product delivery line, shown here as bottom wall 75 that supports ramp 71. Ramp 71 presents an angle of attack or ramp angle with respect to bottom wall 75 that lifts product or particulate material 17 (FIG. 1) that drags along bottom wall 75. The angle of attack or ramp angle is typically between about 2-degrees and 25-degrees, plus or minus 10-percent, more typically between about 3-degrees and 10-degrees, and most typically about 5-degrees, plus or minus 10-percent.

Figure 4:
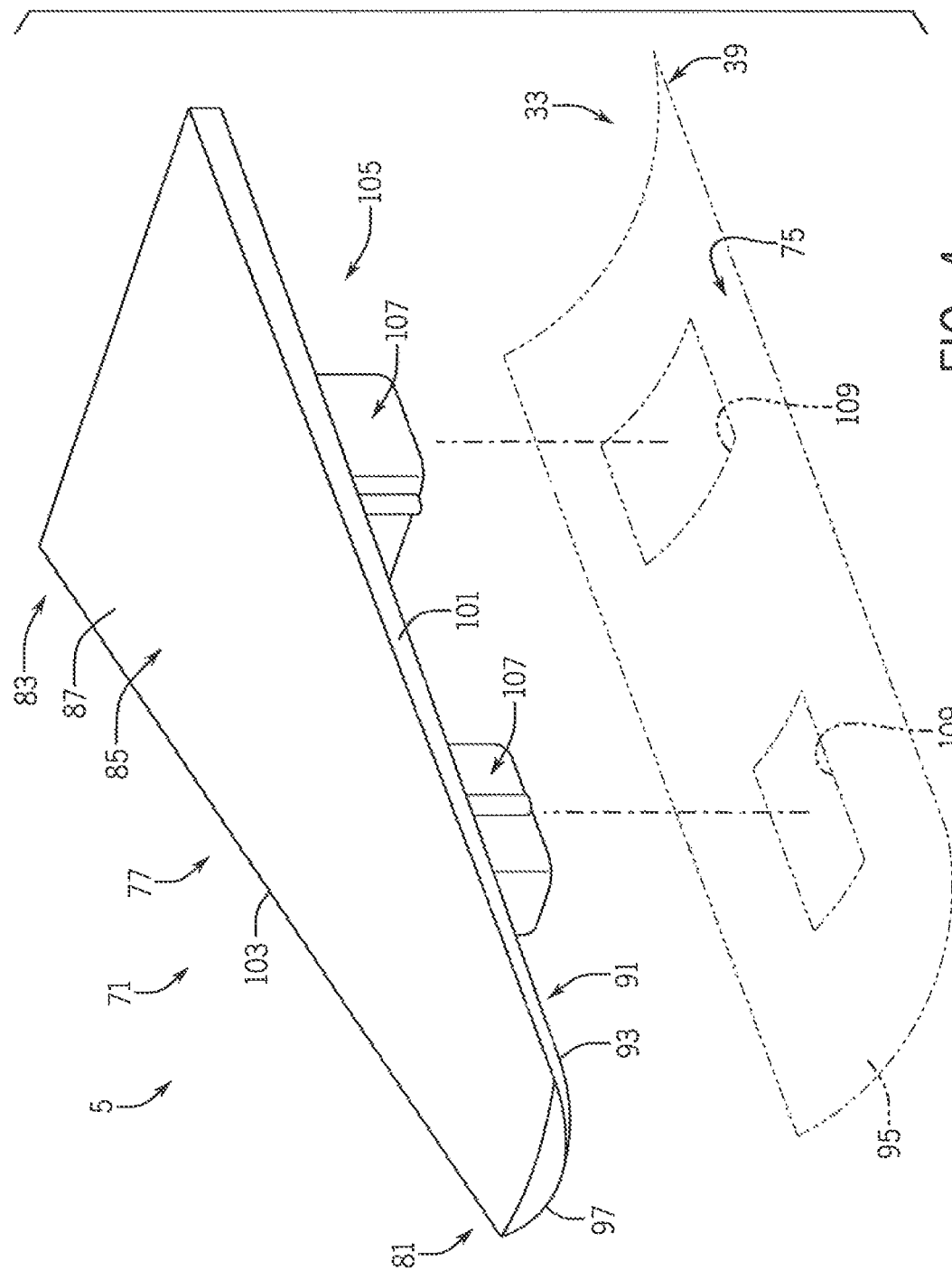
FIG. 4 is a simplified partially schematic isometric view of a distribution ramp of the distribution ramp system of FIG. 1.

Referring now to FIG. 4, ramp 71 includes ramp body 77 mounted against the delivery line lower wall segment or bottom wall 75. First and second ends, shown as front and back ends 81, 83 respectively face upstream and downstream in long line 39. Ramp top wall 85 presents a generally planar ramped surface 87. Ramp bottom wall 91 presents a generally curved surface, shown here as convex surface 93. A radius of curvature of convex surface 93 is shown matching a radius of curvature of bottom wall's 75 upwardly facing concave surface 95. This allows the ramp 71 to nest snugly against bottom wall 75 with an entire length of a curved lower edge 97 of ramp body's front end 81 in face-to-face engagement with a corresponding portion of bottom wall 75.

Still referring to FIG. 4, ramp 71 may have a generally triangular perimeter shape when viewed from above. A pair of side edges 101, 103 extend angularly away from each other from the front end 81 to the back end 83, giving ramp body 77 a variable width that widens from its front to back ends 81, 83. The widening and increased thickness of ramp 71, toward its back end 83 or along its length in the downstream direction, provides the direction-changing surface from which the settled particulate material may launch back toward a central portion of the product delivery line's interior. Correspondingly, the downwardly thinning and inwardly tapering form of ramp 71 toward its front end 81 or along its length in the upstream direction provides a narrow and thin end at the front of ramp 71 that can glancingly engage below or wedge under the flowing mass of settled particulate material 17 (FIG. 1) traveling past ramp 71 while flowing in the downstream direction.

Still referring to FIG. 4, mounting arrangement 105 secures the ramp 71 to long line 39. Mounting arrangement 105 may include at least one projection cooperating with a receptacle, shown here with a pair of projections 107 of ramp 71 that engage in a pair of receptacles 109 of long line bottom wall 75 that have perimeter shapes that correspond to those of the projections 107. Projections 107 are received in the receptacles 109 to longitudinally and transversely locate distribution ramp 71 with respect to the product delivery line, shown as long line 39.

Figure 5:
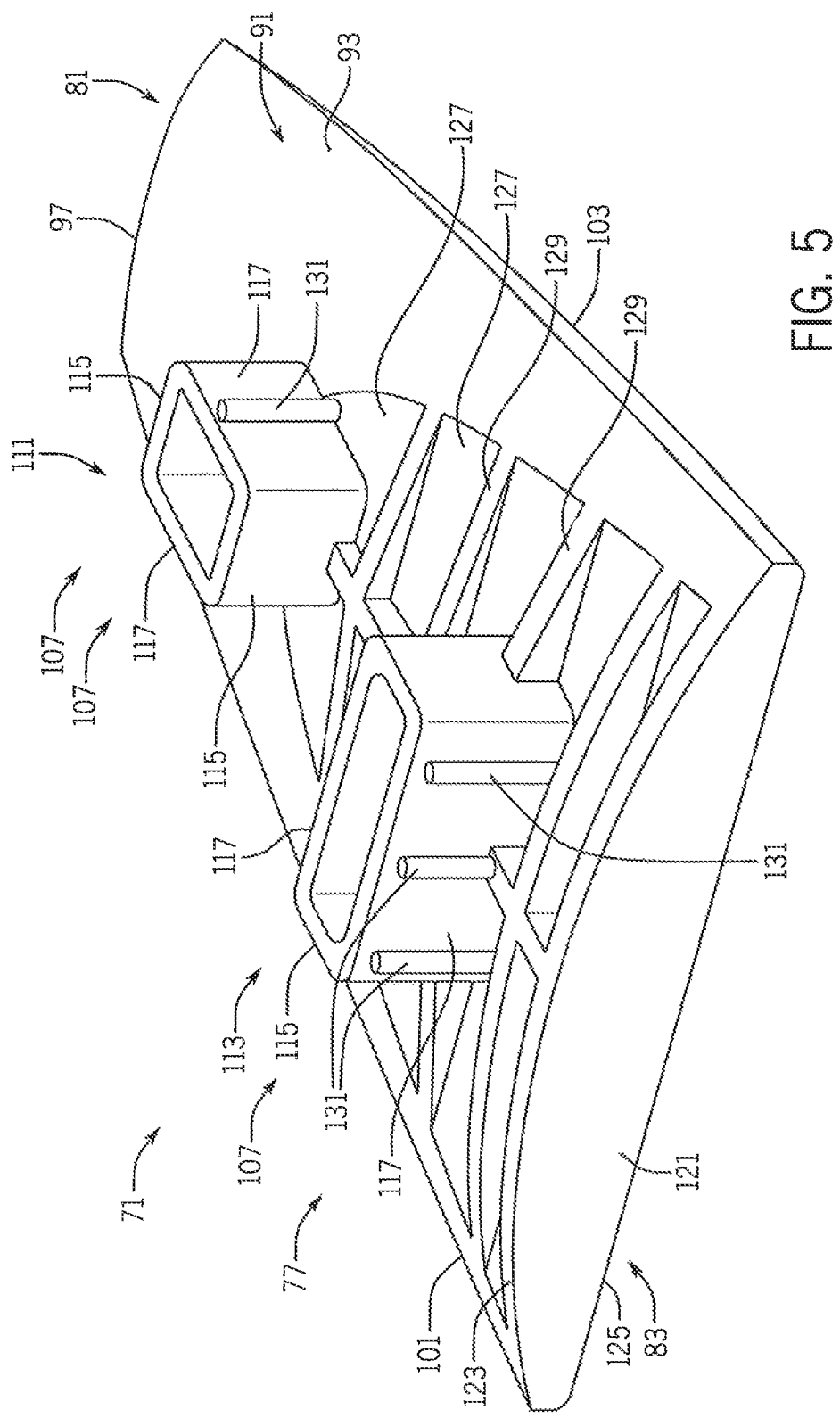
FIG. 5 is an isometric view from below the distribution ramp of FIG. 4.

Referring now to FIG. 5, this view of ramp 71 shows it upside down with a pair of projections 107 extending from ramp bottom wall 91 as a pair of orientation bosses. The orientation bosses are represented as front orientation boss 111 and rear orientation boss 113. Each orientation boss 111, 113 typically has a perimeter shape that corresponds to a perimeter shape defined by an edge surrounding an opening of the corresponding receptacle 109 (FIG. 4), shown here as a generally rectangular shape with rounded corners. Orientation bosses 111, 113 are shown with generally hollow bodies defined by interconnected walls, including a pair of shorts sidewalls 115 and a pair of long sidewalls 117 that collectively define the generally rectangular perimeter shape. Orientation bosses 111, 113 are arranged generally perpendicularly with respect to each other, shown here with a front orientation boss 111 arranged longitudinally and rear orientation boss 113 arranged transverse with respect to the length of ramp 71. The long sidewalls 117 of front orientation boss 111 are generally parallel to a longitudinal axis of ramp 71 and the long sidewalls 117 of rear orientation boss 113 are generally perpendicular to the longitudinal axis of ramp 71. Back wall 121 is defined at back end 83 and has a curved lower edge 123 with a radius of curvature that matches that of the concave surface of bottom wall 75 (FIG. 4) and a flat or straight top wall 125 which corresponds to the top and edge of ramp 71 from which particulate material 17 leaves ramp 71 while flowing over it. Toward back end 83, ramp bottom wall 91 is shown here with a series of depressions 127 separated from each other by upwardly extending curved ribs 129 that present curved surfaces that partially define the convex surface 93 of ramp bottom wall 91

Still referring to FIG. 5, at least one lock of the projection(s) 107 engages the product delivery line circumferential sidewall, such as bottom wall 75, to resist withdrawal of the projection(s) 107 from the respective receptacle 109 (FIG. 4) opening. The lock(s) is represented here as a crush rib(s) 131 that extend outwardly from and along a major portion of the height of the projection(s) 107, such as along substantially the entire height of long sidewalls 117.

Crush rib 131 faces transversely outward from or to the side(s) of the ramp 71 of front orientation boss 111 and multiple crush ribs 131 face longitudinally outward from or to the rear of ramp 71. Although not shown, it is appreciated that crush ribs 131 extend from other surfaces of orientation bosses 111, 113, such as the opposite long sidewalls 117 so each orientation boss 111, 113 has crush ribs 131 extending from opposite sidewalls. Each crush rib 131 made from a polymeric or elastomeric material that deforms to allow insertion of orientation bosses 111, 113 into the receptacle 109 (FIG. 4), with the deformation or restorative biasing frictionally and otherwise locking orientation bosses 111, 113 in place within receptacle 109 (FIG. 4).

Figure 6:
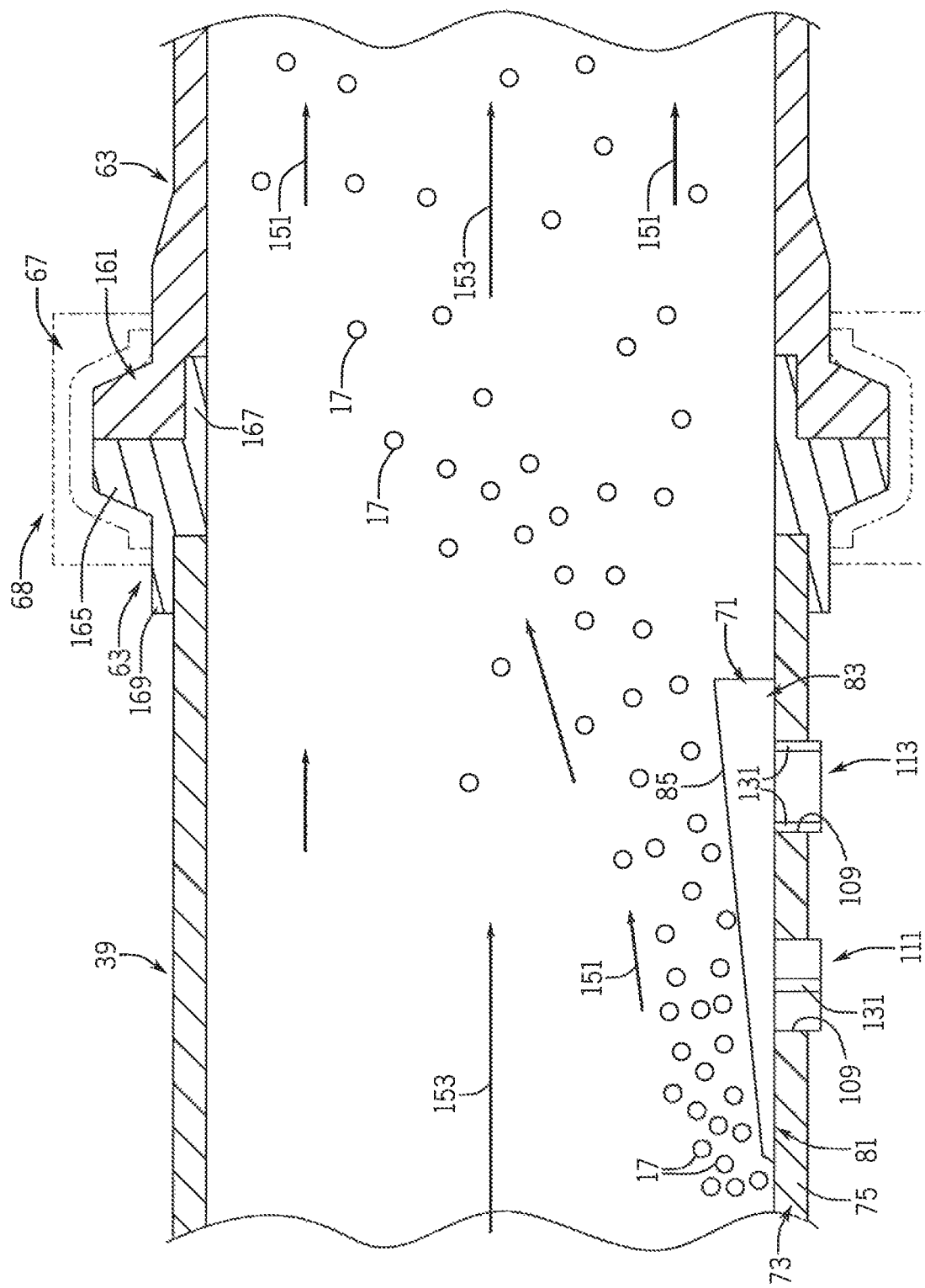
FIG. 6 is a cross-sectional side elevation view of the distribution ramp system of FIG. 1 during use.

Referring now to FIG. 6, ramp 71 is shown mounted to long line 39 with orientation bosses 111, 113 locked into receptacles 109. Orientation bosses 111, 113 have a greater height than the thickness dimension of the long line circumferential sidewall 73 or bottom wall 75. This allows orientation bosses 111, 113 to extend entirely through the thickness dimension of bottom wall 75, with lower ends of the orientation bosses 111, 113 exposed outside of the long line 39. When crush ribs 131 are deformed during insertion of orientation bosses 111, 113 through receptacles 109, they present shoulders or barb-like masses that extend beyond perimeter edges of receptacles 109, which mechanically locks ramp 71 into long line 39.

Still referring now to FIG. 6, upstream of ramp 71 or at its front end 81, most of particulate material 17 is shown clinging to and flowing along the bottom wall 75 of long line 39, as settled particulate material that is guided by the airflow's peripheral airflow portion 151. Fewer pieces of particulate material 17 are entrained in the primary or central airflow portion 153 upstream of or at the front end 81 of ramp 71. At ramp 71, particulate material 17 slides along the product delivery line bottom wall, and then glances off the ramp's top wall 85, which guides it out of the peripheral airflow portion 151 and back toward or into central airflow portion 153. Downstream of ramp 71, particulate material 17 defines a more uniform distribution in its entrainment in the central airflow portion 153.

Still referring to FIG. 6, ramp 71 is shown here immediately upstream and adjacent to joint 68. At joint 68, a flange 161 of the first distributor body segment 63 is shown with a thicker base and tapering outer radial portion that engages a cooperating structure of an adapter ring 163, represented as flange 165, when squeezed by v-band clamp 67. Adapter ring 163 has a front collar 167 that extends from the adapter ring's main body portion and inserts into an annular slot or groove of distributor body segment 63, radially below flange 161. Rear collar 169 extends from the adapter ring's main body portion in the opposite direction from front collar 167 and provides an annular slot or groove that receives an end of long line 39, radially below and abutting a shoulder defined between the collar 169 in the main body portion of adapter ring 163.

Many changes and modifications could be made to the invention without departing from the spirit thereof. One example is that although system 5 is shown in a horizontal use orientation, it is understood that it can be implemented in a vertical use orientation, depending on the particular end-use application. This can be done by mounting distribution ramp 71 in a line or other component that is arranged generally vertical instead of horizontal. The above description(s) of components and systems of the horizontal orientation apply equally to such a vertical orientation, only rotated 90° or upright. As another example, although ramp 71 is described as a friction fit-type mounting that may deform the crush ribs 131, it is understood that other mounting approaches can be implemented. Examples include mounting ramp 71 to line 39 with fasteners or other mounting hardware or by adhesion with a suitable adhesive product. In implementations in which both ramp 71 and line 39 are made from similar metallic materials, ramp 71 may be attached to line 39 by welding. The scope of these changes will become apparent from the appended claims.

We claim:

1. A distribution ramp system for a dry agricultural product applicator with a pneumatic conveyance system through which particulate material of a dry agricultural product is guided from an upstream bulk storage system to downstream nozzles for delivery onto an agricultural field, the distribution ramp system comprising:
   a product delivery line of the pneumatic conveyance system, the product delivery line including a circumferential sidewall that defines a wall segment; and
   a distribution ramp with a ramp body mounted against the product delivery line wall segment; the ramp body including:
      a first end that defines a front end facing an upstream direction;
      a second end that defines a back end facing a downstream direction; and
      a ramp surface extending between the front and back ends, the ramp surface inclined with respect to the product delivery line wall segment to guide particulate material flowing along the product delivery line wall segment upwardly away from the product delivery line wall segment while traveling along the ramp surface;

a mounting arrangement at a point of engagement between the ramp body and the product delivery line to positionally lock the ramp body with respect to the product delivery line and wherein the mounting arrangement includes:

a projection; and a receptacle;

with the projection received in the receptacle to longitudinally and transversely locate the distribution ramp with respect to the product delivery line;

wherein:

the projection defines a first projection extending from the distribution ramp;

the receptacle defines a first receptacle extending into the product delivery line circumferential sidewall; and mounting arrangement further includes:

a second projection extending from the distribution ramp;

a second receptacle extending into the product delivery line circumferential sidewall that receives the second projection of the distribution ramp;

wherein:

each of the first and second projections defines a height dimension;

the product delivery line circumferential sidewall defines a thickness dimension; and the height dimensions of the first and second projections are greater than the thickness dimension of the product delivery line circumferential sidewall;

the first and second receptacles are defined by first and second openings extending through the entire thickness dimension of the product delivery line circumferential sidewall; and the first and second projections of the distribution ramp extend entirely through the first and second openings and beyond the product delivery line circumferential sidewall.

2. The distribution ramp system of claim 1, wherein:

the product delivery line has a circular cross-sectional perimeter shape with the product delivery line wall segment defining a concave surface;

the ramp body has a bottom wall defining a convex surface; and the ramp body bottom wall convex surface nests against the product delivery line wall segment concave surface.

3. The distribution ramp system of claim 2, wherein the product delivery line defines a lower wall segment and the ramp body is nested against the lower wall segment.

4. The distribution ramp system of claim 3, the ramp body including:

a pair of side edges extending angularly away from each other from the front end to the back end so that the ramp surface has a variable width that widens from the front end to the back end.

5. The distribution ramp system of claim 1, wherein the ramp body is secured to the product delivery line by at least one of a fastener, an adhesive, or by way of welding.

6. The distribution ramp system of claim 1, wherein each of the first and second projections includes at least one lock that engages the product delivery line circumferential sidewall to resist withdrawal of the first and second projections from the respective first and second openings.

7. The distribution ramp system of claim 6, wherein at least one lock is defined by a crush rib that extends along the height dimension of each of the first and second projections.

8. The distribution ramp system of claim 7, wherein the first and second projections are defined by first and second orientation bosses, with each of the orientation bosses including:

a pair of short sidewalls;

a pair of long sidewalls that have a greater length or width dimension than the short sidewalls;

pair of short sidewalls and the pair of long sidewalls intersecting each other to define a generally rectangular perimeter shape of the orientation bosses.

9. The distribution ramp system of claim 8, wherein the first and second orientation bosses are arranged generally perpendicularly with respect to each other, with:

a first one of the pair of orientation bosses is arranged with its long sidewalls generally parallel to a longitudinal axis of the distribution ramp; and a second one of the pair of orientation bosses is arranged with its long sidewalls generally perpendicularly to the longitudinal axis of the distribution ramp.

10. The distribution ramp system of claim 9, wherein:

the first orientation boss includes at least one crush rib extending transversely away from the longitudinal axis of the distribution ramp; and the second orientation boss includes at least one crush rib extending aligned with or parallel to the longitudinal axis of the distribution ramp.

11. The distribution ramp system of claim 9, wherein at least one of the orientation bosses includes multiple crush ribs on at least one of its sidewalls.

12. The distribution ramp system of claim 1, wherein the product delivery line is a first product delivery line; and the system includes a second product delivery line defining a product distributor connected to, and receiving product from the first product delivery line; and wherein:

the product distributor includes:
- an inlet end connected to the first product delivery line as a primary delivery line through which a primary airflow carries air-entrained dry agricultural product; and
- an outlet end connected to multiple downstream secondary delivery lines through which respective secondary airflows carry air-entrained dry agricultural product; and the distribution ramp is mounted upstream of the product distributor outlet end.

13. The distribution ramp system of claim 12, wherein the distribution ramp is mounted in the first product delivery line upstream of the product distributor inlet end to guide the dry agricultural product along a travel path extending angularly upward away from the delivery line wall segment.

14. The distribution ramp system of claim 12, wherein:

the distributor includes a distributor body;

a mixer with a mixer shaft is arranged concentrically in the distributor body and rotates to distribute the dry agricultural product in the distributor body; and the distribution ramp is mounted upstream of the product distributor inlet end to guide the dry agricultural product toward the mixer shaft.

* * * * *